J. H. HUGHES.
Bearing for Wheels.
No. 227,632.                                   Patented May 18, 1880.
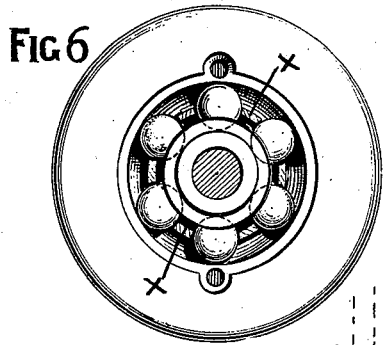
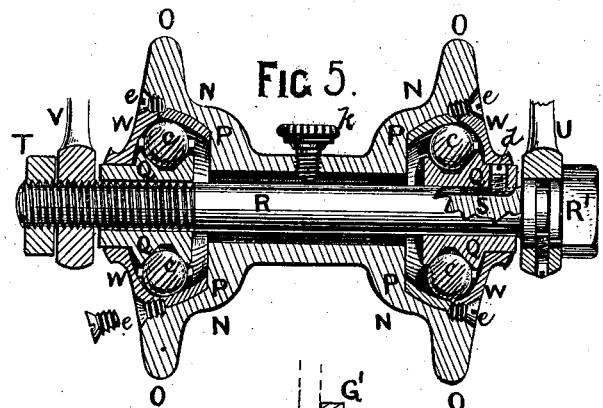
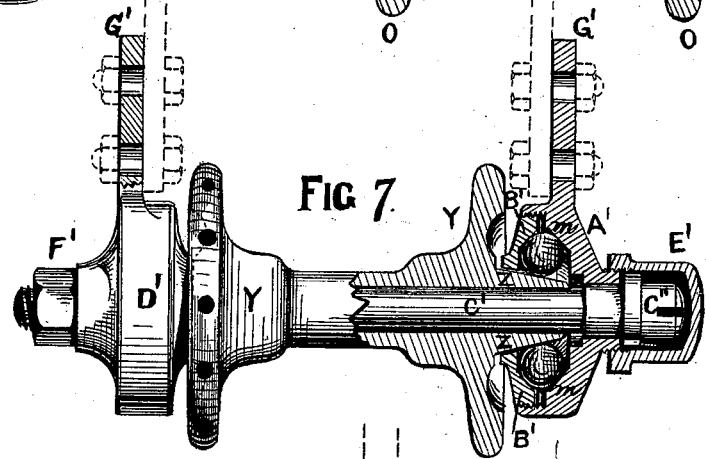
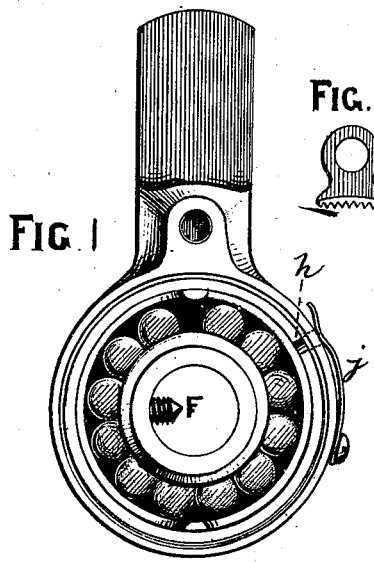
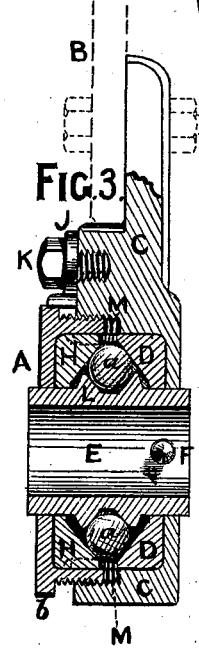
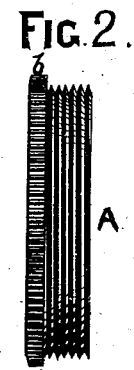
Witnesses:
Sam R. Turner
Penn Halsted
Inventor
Joseph Henry Hughes
by John J. Halsted
Atty.

UNITED STATES PATENT OFFICE.

JOSEPH H. HUGHES, OF BIRMINGHAM, ENGLAND, ASSIGNOR TO WILLIAM BOWN, OF SAME PLACE.

BEARING FOR WHEELS.

SPECIFICATION forming part of Letters Patent No. 227,632, dated May 18, 1880.

Application filed February 7, 1880. Patented in England September 19, 1877.

*To all whom it may concern:*

Be it known that I, JOSEPH HENRY HUGHES, of Birmingham, in the county of Warwick, England, have invented certain Improvements in Bearings for the Wheels of Bicycles, Tricycles, and other Velocipedes or Carriages, of which the following is a specification.

English patent dated September 19, 1877, and sealed March 15, 1878.

The object of my improvements is to reduce the friction on the bearings of bicycles, velocipedes, and carriages, and also to provide means of effectually setting up and universally adjusting the bearings so as to regularly compensate for wear, thereby preventing looseness and shackling of the parts; and these improvements consist in the use of hardened metal single or double cones or curved surfaces, in combination with hardened metal spherical balls, and in the means of adjusting the same.

In carrying my invention into effect—say in applying the same to the front or large wheels of bicycles and tricycles—I connect to each end of the fork, by pins and screws or other means, (by preference,) a circular flat-shaped plate or case of iron, brass, or other metal, in which I form or apply a hardened steel cone, with holes in the center for the ends of the spindle (which is parallel) to pass through. A hardened collar or bush is now passed on the spindle and secured in position by a pin, cotter, or other means, and in the said collar, by preference, a groove is formed, in which I place a suitable number of hardened steel balls. A cap fitted with a corresponding hardened-steel cone to that formed in the circular case attached to the fork is now passed over the spindle and screwed into or otherwise secured to the circular case, a sufficient space being left between the outer and inner cases to allow of the adjusting or setting up of the parts after wear. It will be seen that as the conical or curved surfaces and spherical balls are the only points in contact, the friction at this important point is reduced to the lowest possible minimum.

When applying my improvement to the back or small wheels of bicycles or tricycles, in some cases I use, in connection with the grooved collar on the spindle and hardened spherical balls, a curved or concaved steel ring on each side of the bearing, in lieu of the cones, so that when setting up or adjusting the bearing the balls, with the grooved collars or bushes, are made to slide inward on each side, and by the contacting surfaces of the curved or concaved steel rings the balls are forced into the grooves of the collars or bushes, thereby adjusting and setting up the parts after wear. But as my invention will be best understood by the drawings hereunto annexed, I will proceed to describe the same, reference being made to the figures and letters marked thereon.

Figure 1 represents a front view of a bearing with the outside cap removed, which is shown detached in edge view at Fig. 2, (marked A,) and Fig. 3 is a vertical section of the bearing complete, as attached to the one side of the fork of a front or large wheel of a bicycle or tricycle, the fork being shown in dotted lines B, as also the screws for securing the same, which may be effected by other suitable means, according to the description of fork to which such bearings are to be applied. The case C, thus secured to the fork of the bicycle, is fitted, by preference, with the hardened-steel cone D.

The hardened-steel collar or bush E passes on the spindle, and is secured in position by the pin F or other suitable means. In the groove formed in the said collar the balls $a\,a$ (of which any suitable number may be used) rest and abut against the cone D. The outer cap or cover, A, fitted with a corresponding cone, H, to the cone D, is screwed or otherwise advanced into the case C until the cone D comes in contact with the balls, as shown in the section, Fig. 3, in which position the cap is secured by the bracket J and screw K. The outer edge of the cap A, at $b\,b$, is milled or toothed in a corresponding manner to the bottom edge of the bracket J, (shown detached at Fig. 4,) so that when the bearing is applied and adjusted, as at Fig. 3, the outer case is held firmly and securely in position by the bracket J and screw K. Thus it will be seen that in case the parts should, from wear, become loose, the screw K and bracket J have only to be removed, permitting the outer case or cap, A, and cone H to be screwed farther into the case C, when, the space between the cones being contracted, the balls $a$ will be forced farther into the groove L in the collar E, and all the parts brought in contact with each other, thereby universally adjusting the bearing, the space M M between the two cases permitting this to be done. When required, the bearing is lubricated by injecting oil through the small hole $h$, Fig. 1, first sliding aside the spring $j$, which is then replaced in the position shown, completely excluding all dirt or grit penetrating to the interior or working parts.

Fig. 5 is a vertical section of my improved bearing as applied to the back or small wheels of bicycles and tricycles. N N is the hub of the wheel, made of iron, brass, or other suitable metal, the spokes being screwed into the flanges O O O O. The hub is bored out and recessed at each side, as shown, permitting the hardened curved or conical circular rings P P to be driven securely in position. The hardened bushes Q Q, with the grooves formed in them for supporting the balls $c$, slide loosely on the spindle R at each end, but are prevented from turning round with the balls $c$ by a small pin, $d$, screwed through the bush, which passes into a groove made in the spindle, as exhibited at S. All dust or dirt is prevented from passing into the interior by the caps W W, which are secured in position by the screws $e\ e$.

Fig. 6 is an end view of the bearing with the cap W removed, showing the position of the balls $c$ in the hub, and also that the balls are kept apart by a ring, X, with holes in it, preventing any noise or rattling of the balls, which would otherwise take place from the high velocity with which the back wheel revolves.

For lubricating, it is simply necessary to remove the screw-cap $k$, when the oil can be injected into the interior through the hole, and the screw-cap replaced.

In applying this bearing to a back or small wheel of a bicycle or tricycle after the bearing is put together, it is simply necessary to remove the lock-nut T and withdraw the spindle R. The bearing without the spindle is then introduced between the forks U V of the bicycle, and the spindle R is then passed through a thoroughfare-hole in the fork U, but screwed into the fork V until all the parts are so drawn together that the hardened balls $c\ c$, hardened bushes Q Q, and hardened circular curved rings P P are all in contact together, as here exhibited, when the lock-nut T is applied, which securely holds the various parts in their respective positions.

When it is desirable to set up this small-wheel bearing after wear the lock-nut T has to be removed and the spindle-head R′ turned round or screwed in by means of a wrench, which will have the effect of drawing the forks U V nearer together, forcing or sliding the bushes Q Q inward from each side on the spindle, and, as a consequence, carrying the balls $c$ on each side farther into the contracted circular rings P P, until all the surfaces are in contact, when the lock-nut T can be again screwed on, thus adjusting and firmly securing all the parts in position.

In cases where it is desirable to apply the bearings of the small or back wheels independently of the hub, I adopt the modification as exhibited, partly in section and partly in elevation, at Fig. 7.

The hub Y is formed at each end with a hardened cone, Z. The bearing-case A′ is formed with a hardened cone, in which the balls rest, and a cap, B′, with a corresponding cone, is screwed into the said case until the cones are in contact with the balls. It is then passed into the position shown on the hardened cone Z, and the spindle C′ is passed through this and the bearing D′ on the other side of the hub. The head of the spindle is covered over, by preference, with a hollow nut, E′, which has to be removed only when the bearing requires adjusting, this being effected, as in the former case, by removing the lock-nut F′ and screwing up the spindle C′ by means of a turn-screw applied to the head of the spindle C″, bringing the forks (shown in dotted lines) attached to the shanks G′ G′ of the bearing-cases A′ D″ closer together, which has the effect of forcing the balls farther on the cone Z and against the conical surfaces $m\ m$ of the case A′ and cap B′, thus bringing all the frictional parts in contact. The lock-nut F′ and hollow nut E′ must now be again applied, when the bearing will be adjusted and set up and again complete, as shown.

Having now described the nature of my said invention, and the manner of giving effect to the same, I wish it understood that I do not purpose confining myself to the exact details herein described and exhibited, as the same may be varied without departing from the spirit of my improvements; but

What I claim, and wish protected by Letters Patent is—

In bearings for bicycles, tricycles, or carriages, the combination of hardened conical or curved surfaces, hardened spherical balls, and the means, substantially as shown and described, of adjusting or setting up the parts, for the purposes set forth.

JOSEPH HENRY HUGHES.

Witnesses:
 WM. LOACH,
 T. SCATTERGOOD.